(12) United States Patent
Gold et al.

(10) Patent No.: US 7,058,708 B2
(45) Date of Patent: Jun. 6, 2006

(54) METHOD OF AND APPARATUS FOR MANAGING PREDICTED FUTURE USER ACCOUNTS ASSIGNED TO A COMPUTER

(75) Inventors: Stephen Gold, Bristol (GB); Peter Thomas Camble, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 731 days.

(21) Appl. No.: 09/878,185

(22) Filed: Jun. 12, 2001

(65) Prior Publication Data

US 2002/0194326 A1 Dec. 19, 2002

(51) Int. Cl.
*G06F 15/13* (2006.01)

(52) U.S. Cl. .................. 709/224; 709/232; 370/329

(58) Field of Classification Search ............... 709/224, 709/232; 370/329
See application file for complete search history.

(56) References Cited

U.S. PATENT DOCUMENTS

| | | | | |
|---|---|---|---|---|
| 5,193,171 A | * | 3/1993 | Shinmura et al. | 711/113 |
| 5,671,410 A | * | 9/1997 | Mizuno et al. | 707/104.1 |
| 5,848,270 A | * | 12/1998 | DeLuca et al. | 718/105 |
| 5,966,372 A | * | 10/1999 | Wright et al. | 370/329 |
| 6,209,033 B1 | * | 3/2001 | Datta et al. | 709/224 |
| 6,338,080 B1 | | 1/2002 | Durand et al. | |
| 6,839,767 B1 | * | 1/2005 | Davies et al. | 709/232 |
| 2002/0002616 A1 | * | 1/2002 | Lim | |
| 2002/0019873 A1 | * | 2/2002 | Goldszmidt et al. | |
| 2002/0107026 A1 | * | 8/2002 | Agrawal et al. | 455/453 |

* cited by examiner

*Primary Examiner*—John Follansbee
*Assistant Examiner*—Jinsong Hu

(57) ABSTRACT

There is disclosed a method and components for managing admission of new user accounts onto a computer entity, for example a headless computer entity, by predicting future utilization of functionality by each of a plurality of existing user accounts on the computer entity, as well as predicting a utilization of any new user accounts requested to be admitted to the computer entity. Various warnings are displayed to an administrator, and an administrator can modify and override automatically generated limit parameters for admitting or rejecting new user accounts. The method and apparatus automatically manage entry and rejection of new users onto the computer entity, without the need for administrator intervention at every admission of a new user account.

5 Claims, 11 Drawing Sheets

METHOD OF AND APPARATUS FOR MANAGING PREDICTED FUTURE USER ACCOUNTS ASSIGNED TO A COMPUTER

FIELD OF THE INVENTION

The present invention relates to the field of computer entities and particularly, although not exclusively, to management of data storage capacity in such computer entities.

BACKGROUND TO THE INVENTION

Known data storage servers and application servers, allow usage by a plurality of users, relying on the server to provide either data storage capacity, or application functionality. Examples of such prior art servers, used by a plurality of users includes network attached storage devices (NAS), providing data storage functionality to a plurality of client computers.

In the case of a server providing data storage capacity, each user may utilize a variable amount of data storage capacity depending upon the users particular needs.

In prior art network attached storage devices, there may be extreme variation in the amount of data capacity which each client computer uses, since different clients may store different amounts of data. Further, since the data can be compressed by varying degrees, this introduces another variability in the data capacities which can be stored by each client computer. Typically, in prior art network attached storage devices, there is no limit to the number of users which can be assigned to a server computer entity. Assignment of users to a server computer entity is made by an administrator via a user console comprising a visual display unit, keyboard, and pointing device such as a mouse or the like.

It is also known that network attached storage devices may be provided in the form of headless computer entities, also known as "headless appliances". A known headless computer entity comprises a data-processor, memory, a plurality of input/output ports or the like, and an operating system. Headless appliances are generally designed without user interfaces, and lack a keyboard, pointing device e.g. mouse or track ball, and visual display monitor. This has the advantages both of reducing the cost of ownership, since the cost of a user interface hardware need not be borne by the purchaser, and also inhibiting interference with the operation of the appliance.

In a headless computer entity, human administrators are conventionally allowed only very limited access to the computer entity for maintenance, or in some cases no user maintenance is permitted.

Known headless computer entities have fixed data storage disk configurations of a pre-determined data capacity. Customers cannot upgrade the disk configuration and increase the amount of application data held on a headless computer entity, once purchased. This helps to protect against customer mis-configuration of the appliance, and also protects the manufacturers pricing scheme where headless computer entities are sold with price dependent on data storage capacity.

There is a problem with known server computer entities serving functionality to a plurality of users, that the amount of functionality, for example data storage capacity, required for each user is variable with a wide degree of variation, and conventionally, adding or removing new users from a server computer entity requires intervention from a human administrator. Further, there is no embedded limit on the number of users which can be added to a server computer entity. Therefore, there is a possible scenario that too many users can be added to a server computer entity, and the users can increase their utilization of the computer entity's functionality to an extent where the combined demand from the plurality of users exceeds the available functionalities supplied by the computer entity. This problem is present both in conventional computer entities having a administration console, and in headless computer entities. Because of the lack of administration console the problems are more acute in headless computer entities.

SUMMARY OF THE INVENTION

According to specific implementations of the present invention, there is provided an algorithm which can is used to calculate a capacity threshold value, being a projected total capacity value which will be used by a plurality of users of a computer entity at a future time. When the number of users assigned to a computer entity causes this capacity threshold value to be reached, the algorithm prevents registration of new users at the computer entity. Therefore, for a computer entity having a fixed capacity, the algorithm prevents that capacity being used up by too many users, and allows enough spare capacity such that current users currently assigned to the computer entity can extend their use of capacity over a defined period of time, for example 2 years. The algorithm can be overriden by a human administrator via an administration interface. In the case of a headless computer entity, the administration interface is provided as a web administration interface.

According to first aspect of the present invention there is provided a method of managing a plurality of user accounts assigned to a computer entity, said method comprising the steps of:

determining an overall predicted future utilization of functionality of said computer entity which will be required to support said plurality of user accounts;

comparing said predicted utilization of functionality with a currently available amount of unused functionality of said computer entity; and allowing or disallowing addition of a new user account onto said computer entity, depending upon a result of said comparison.

According to a second aspect of the present invention there is provided a computer entity comprising:

at least one data processor;

at least one data storage device;

a capacity management component for managing data storage capacity of said data storage device, said capacity management component comprising:

a prediction component for predicting future utilization of data storage capacity for a plurality of user accounts;

a compare component for comparing a predicted future utilization of said plurality of user accounts with a data storage capacity currently available for use on said data storage device; and a control component operating to activate said prediction component and compare component.

According to the third aspect of the present invention there is provided a method of operating a computer entity comprising at least one data processor, and a data storage device for automatically admitting or rejecting a new user account onto said computer entity, said method comprising the steps of:

in response to a request to add a new user account to said computer entity, (i) generating a prediction of future utilization of data storage capacity required by said requested new user account, for a predetermined look ahead period;

(ii) for each of a plurality of user accounts currently installed on said computer entity, determining a predicted future utilization of capacity by said user account;

(iii) from said result of steps (i) and (ii), determining an overall predicted future utilization of said functionality of said computer entity over said pre-determined look ahead period;

(iv) determining a currently available unutilized functionality of said computer entity, unused by any of said current user accounts;

(v) comparing said currently unused functionality with said predicted future utilization of functionality, and (vi) depending upon a result of said comparison, allowing or disallowing entry of said new user account onto said computer entity.

Other features of the invention are as recited in the claims herein.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as to unnecessarily obscure the present invention.

In this specification, the term "user" is used to encompass both a human being user, and a computer user.

In this term the specification "user account" is used to describe an account which is uniquely identifiable, for example by means of a unique account number, and which can be assigned to either a human user or a client computer entity user. An account may be transportable between client computer entities, and a human user may have more than one account.

The best mode implementation described herein refers to a headless computer entity serving data storage capacity to a plurality of client computers. However the invention is not limited to headless computer entities, and the methods and embodiments disclosed herein. In a broader sense, encompass conventional computer entities having a user console comprising visual display unit, keyboard, and mouse.

Figure 1:
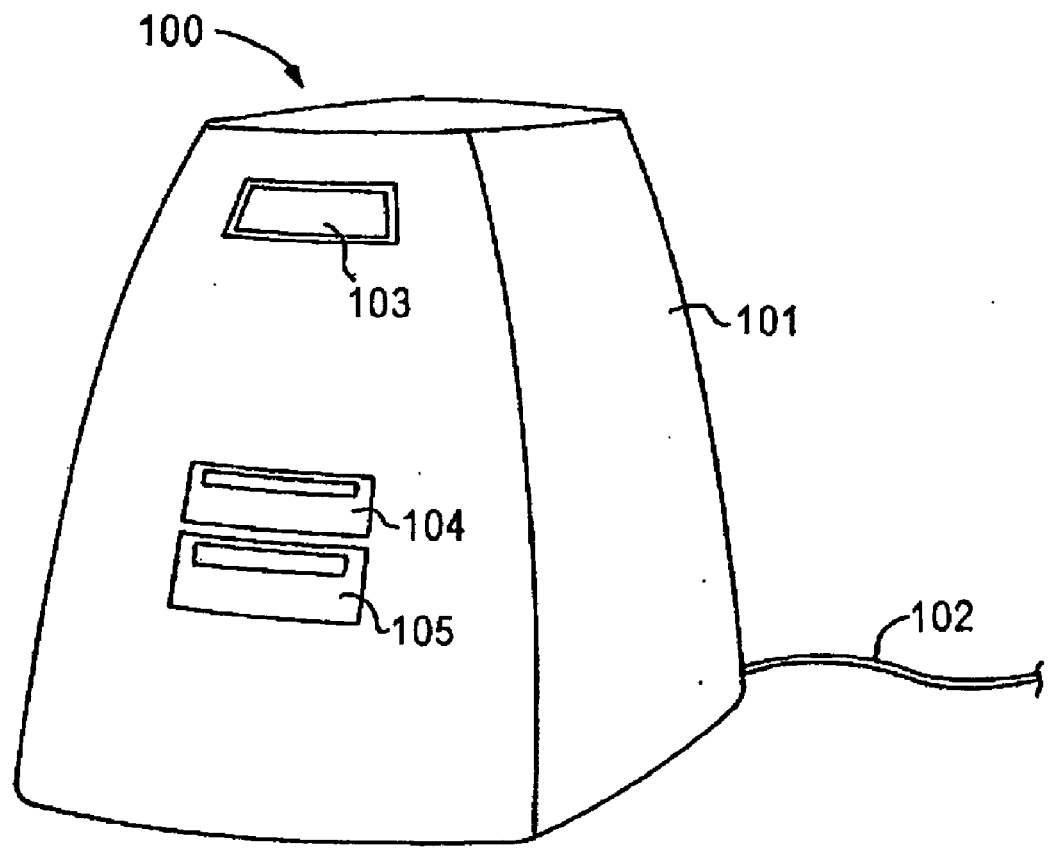
FIG. 1 illustrates schematically in external perspective view a headless computer entity according to a specific implementation of the present invention.

Referring to FIG. 1 herein there is illustrated schematically in perspective view a headless computer entity 100 comprising: a casing 101 containing a processor, memory, one or more data storage devices and one or more communications ports connectable to a local area network 102; a relatively small display screen, for example a liquid crystal (LCD) display 103 capable of giving limited status information for operations carried out by the computer entity, for example, POWER ON mode, a STAND BY mode, and fault modes of operation; a data entry means 104, for example a CD ROM drive, and optionally a back-up data storage device port 105, for example a digital data storage (DDS) format tape streamer.

The headless computer entity is not provided with a visual display monitor, pointing device e.g. mouse, or keyboard, or other direct user interface, and therefore is difficult for a human operator to interact with directly. In operation, the headless computer entity is intended to be self-managing and self-maintaining. Typically, a headless computer entity will provide a dedicated functionality within a network environment. In the best mode herein, the headless computer entity is configured as a network attached storage device.

Figure 2:
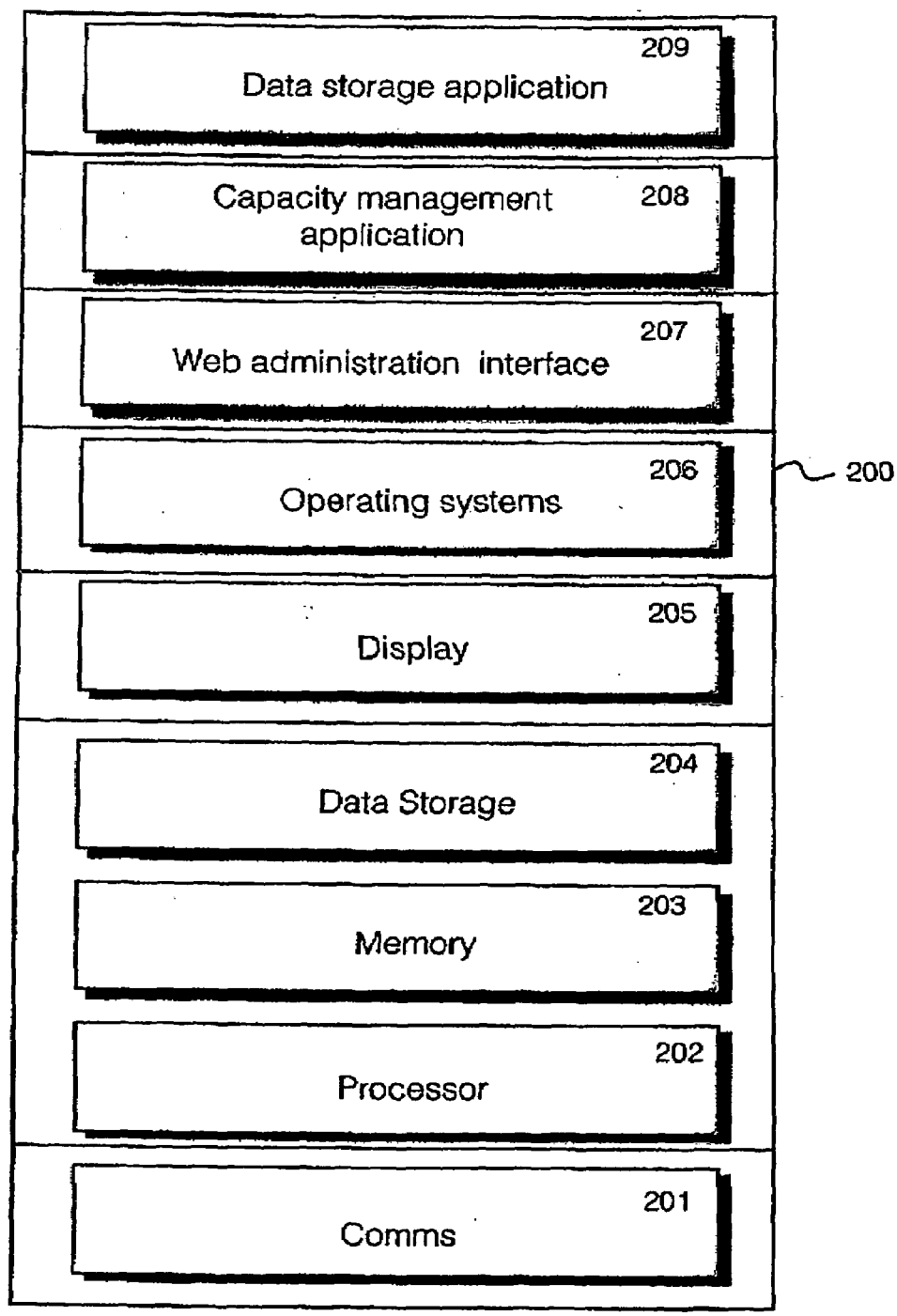
FIG. 2 illustrates schematically an architecture of a headless computer entity according to the specific implementation of the present invention.

Referring to FIG. 2 herein, there is illustrated schematically an architecture of hardware and firmware components of the headless computer entity 200. The entity 200 comprises one or more communications ports 201; one or more data processing devices 202 as are known in the art; a memory 203 associated with the data processor(s); at least one data storage device 204, for example a hard disk data storage device, or an array of a plurality of hard disk data storage devices; a small display, e.g. a liquid crystal display device 205; a plurality of operating systems 206 as will be described herein after; a web administration interface 207; a capacity management application 208 for managing access and use of the data storage capacity of the computer entity; and one or a plurality of application programs 209 providing functionality to the headless computer appliance.

The operating system 206 is stored on a non-volatile data storage device, for example a hard disk drive, or a RAID array.

Figure 3:
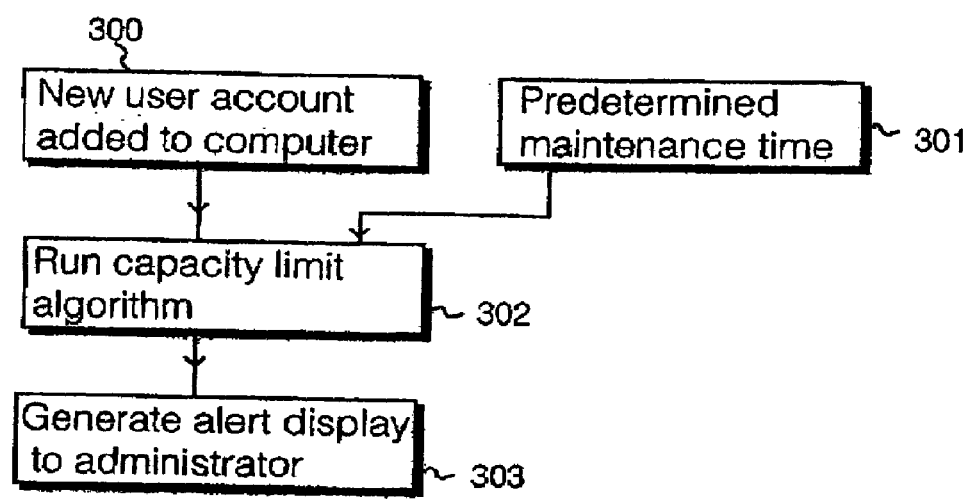
FIG. 3 illustrates schematically overall processes for determining whether a new user account can be added to a computer entity, and for generating alerts and displays informing an administrator of a current status and/or future predicted status of the computer entity.

Referring to FIG. 3 herein, there is illustrated schematically overall process steps carried out by capacity management application 208 for enforcement of user admission to the computer entity. Every time a new user account is added to the computer entity in process 300, and even where no new user accounts are added, every time a pre-determined maintenance period occurs in process 301, a user capacity limiting algorithm 302 is run. The capacity limit algorithm operates on the basis of a number of "user accounts", which in the case of a network attached storage device are client backup accounts. The capacity limit algorithm prevents too many users being installed on the computer entity which would result in using up all the available licensed data storage capacity. The capacity limit algorithm is run by the computer entity on a regular basis, for example whenever a new user account is stored plus once per day, at the end of a nightly data maintenance job. The capacity limit algorithm determines a predicted capacity growth trend for user accounts currently installed on the computer entity and then calculates how much currently available licensed data storage capacity is used by each currently installed user account, assuming a look ahead growth period from the installation date of each user account. Typically the look ahead period will be set to predict in advance for a pre-determined period, for example two years growth from the installation date of each user account. Where a user account has not been installed long enough to predict a capacity usage trend data, then default values, generated from a sample of typical user accounts, may be used to assign a predicted capacity growth trend to that user account. Each time the capacity limit algorithm is run, it produces as an output a value of predicted growth requirement, in units of megabytes. Depending upon the current number of user accounts assigned to the computer entity, and their predicted capacity growth requirement in megabytes, the capacity limit algorithm either prohibits entry of new user accounts, or allows entry of new user accounts.

As a result of running the capacity limit algorithm, there are generated display messages to alert an administrator of the computer entity to a status of the predicted capacity utilization of the computer entity, and to alert of any impending problems, such as requirements for upgrades of a computer entity to higher capacity value models or removal of user accounts to avoid capacity limit violation in the future. The displays are accessible in the case of a headless computer entity over the web administration interface 207, and LCD display 205.

Running the user capacity limit algorithm often, allows a human administrator to manage the number of users assigned to the computer entity, and avoid future problems from over usage of data storage capacity, and avoid placing too many users onto a computer entity, which may give rise to future capacity limit violations. Regular operation of the capacity limit algorithm may allow a human administrator to plan well in advance for any system upgrades required.

Figure 4:
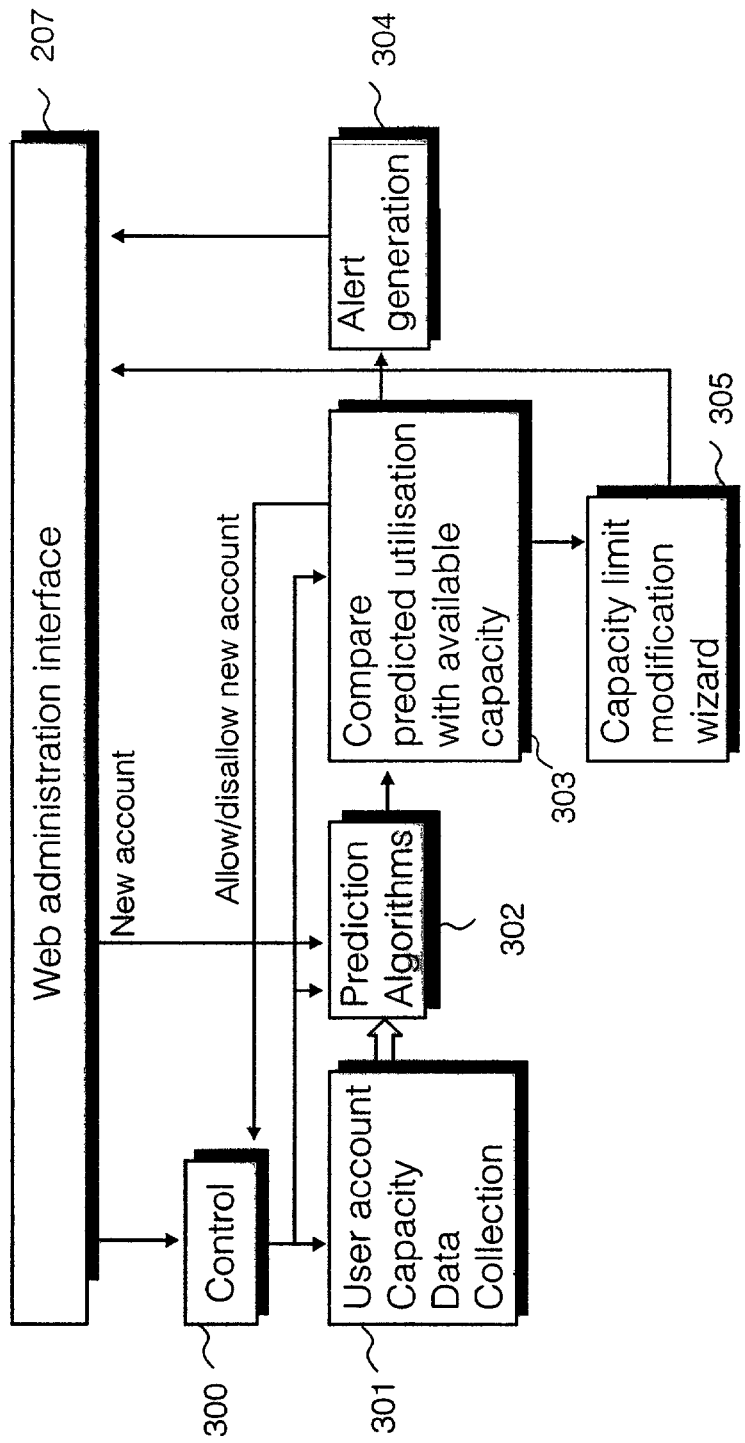
FIG. 4 illustrates schematically a capacity management component of a headless computer entity, for managing admission of new user accounts onto the computer entity.

Referring to FIG. 4 herein, there is illustrated schematically the web administration interface 207, and components of the capacity management application 208. Each component may be implemented as code in a conventional programming language such as C,C++, or the like, or may be implemented as firmware on an application specific integrated circuit (ASIC). The capacity management application 208 comprises a control component 300 operating to receive a request for opening of a new account from web administration interface 207, and initiate operation of a capacity limit algorithm in response to a request to open a new user account, and also to run the capacity limit algorithm at pre-determined times, for example once per day; a user account capacity data collection component 301 for collecting data on the actual data storage capacity on the data storage device 204 utilized by each user account installed on the computer entity; a set of prediction algorithms 302, for predicting future data capacity usage requirements for each user account installed on the computer entity, and for generating a prediction data describing a predicted data storage capacity requirement for any new user account requested to be entered onto the computer entity; a comparison component 303 for comparing a predicted utilization of existing and requested user accounts with an available currently unused data storage capacity of the data storage device, and for allowing or disallowing opening of a new user account depending upon the result of the comparison, the comparison component 303 also operating to generate a predicted percentage utilization value, for predicted future utilization of the data storage capacity of the computer entity, and depending upon a result of that percentage utilization triggering an alert generation; an alert generator 304 for generating alert messages for display on the web administration interface 207 and/or liquid crystal display 103, when a pre-determined percentage predicted utilization is reached; and a capacity limit modification component 305 for allowing modification of capacity limits by an administrator.

Figure 5:
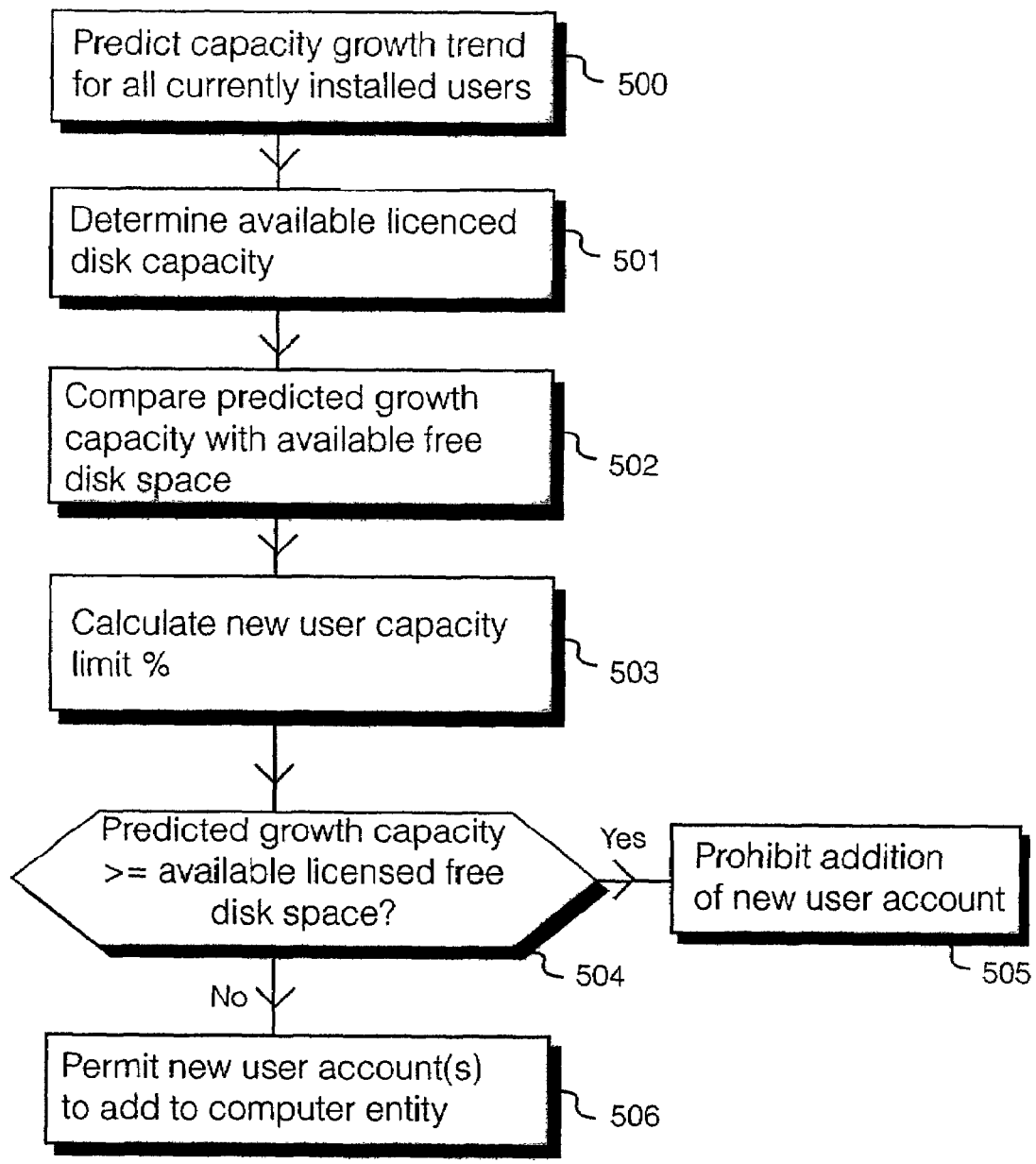
FIG. 5 illustrates schematically in broad overview, process steps carried out by a capacity limitation algorithm for determining whether or not to allow addition of a new user account onto the computer entity.

Referring to FIG. 5 herein, there is illustrated schematically in broad overview process steps carried out by capacity limit algorithm 302. In step 400, for each currently installed user account, the algorithm predicts a capacity growth trend over a pre-determined period, to provide a figure in megabytes of data storage capacity which each individual user account installed on the computer entity is predicted to utilize. In process 501, the algorithm determines the available licensed free data storage capacity on the computer entity at the present time. In process 502, the algorithm compares the predicted growth capacity for all currently installed user accounts, plus any user accounts which it is requested to be newly installed with the available free disk space. In process 503, there is calculated a new user threshold percentage data, being a percentage predicted utilization of the computer entity based upon current users and estimated capacity required by a new user account. In process 504, if the total predicted capacity utilization of all currently installed user accounts, plus any new user accounts requested to be installed, is greater than or equal the available licensed data storage capacity which is currently unutilized, then this indicates that with current user accounts, or with current user accounts plus addition of new user accounts as requested, will at a future date, exceed the capability of the computer entity to those user accounts, based upon the predicted growth in capacity utilization of those user accounts. Therefore, in process 505 there is prohibited the addition of any new user accounts. However, if the predicted capacity of all current user accounts plus any user accounts requested to be added to the computer entity is less than the available currently unutilized data storage capacity of the computer entity, then in process 506 new user accounts are permitted to be added to the computer entity.

In practice, in processes 502 and 504, the algorithm makes a separate prediction of total utilization of the computer entities capacity at a future date for each new user account requested to be added, and therefore takes a decision on addition of each new user account on a per account basis, rather than addition of a set of a plurality of user accounts in one operation.

Figure 6:
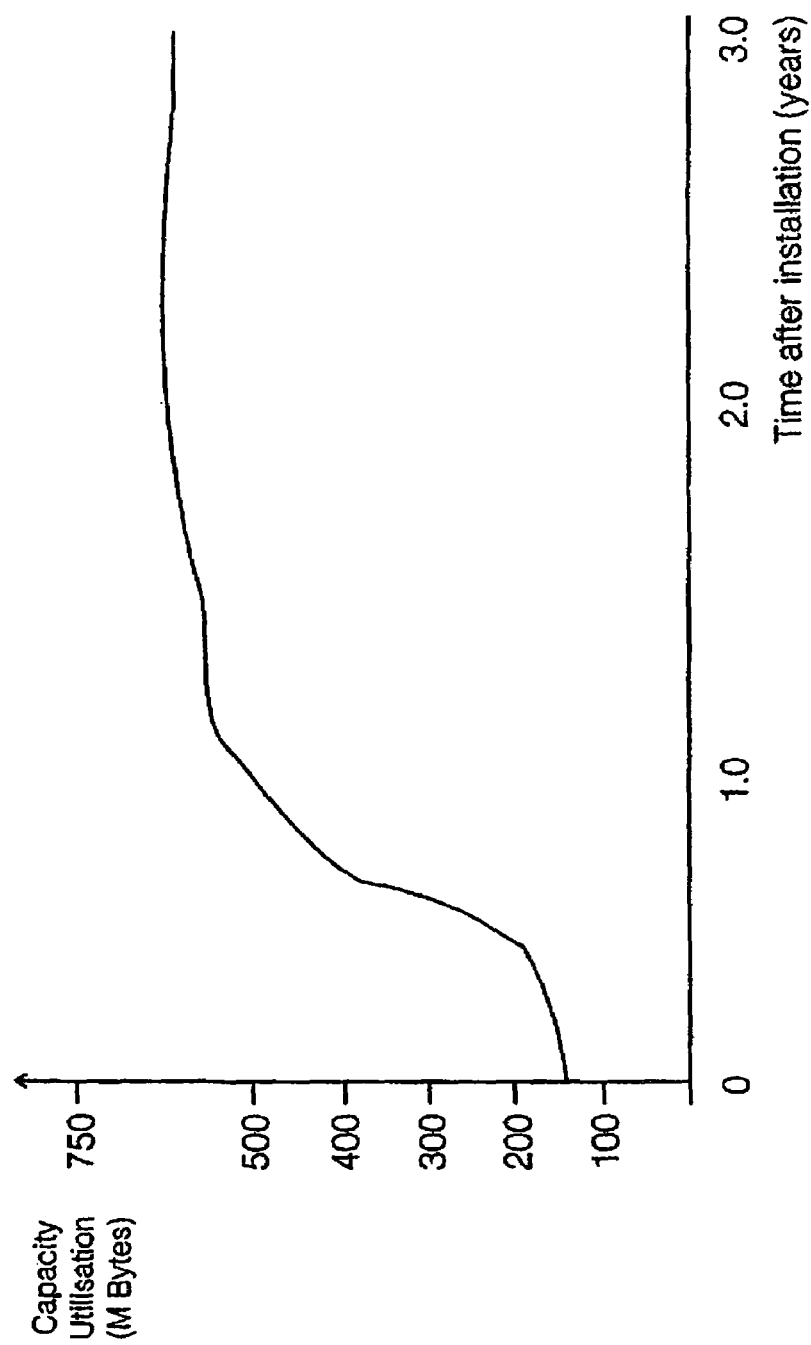
FIG. 6 illustrates schematically a plot of data storage capacity utilized by a single user account on the data storage device of the computer entity, over a period of time.

Referring to FIG. 6 herein, there is illustrated schematically one example of a plot of data storage capacity utilization on a data storage device, by a user account over a period of time. Initially when a user account is installed on the computer entity, some initial data may be stored, for example a back up of an application running on a client computer entity, which may require a pre-determined amount of data storage, for example 100 megabytes or so. Over time, the user account may require a higher amount of data storage capacity, and tend towards a stable amount after a period of time, where a users data storage requirement levels off about an average capacity. For each user, the profile of data storage utilization will be different, depending upon that user accounts own particular requirements and characteristics. On the computer entity serving many different users, each user account will have its own particular capacity utilization profile.

Figure 7:
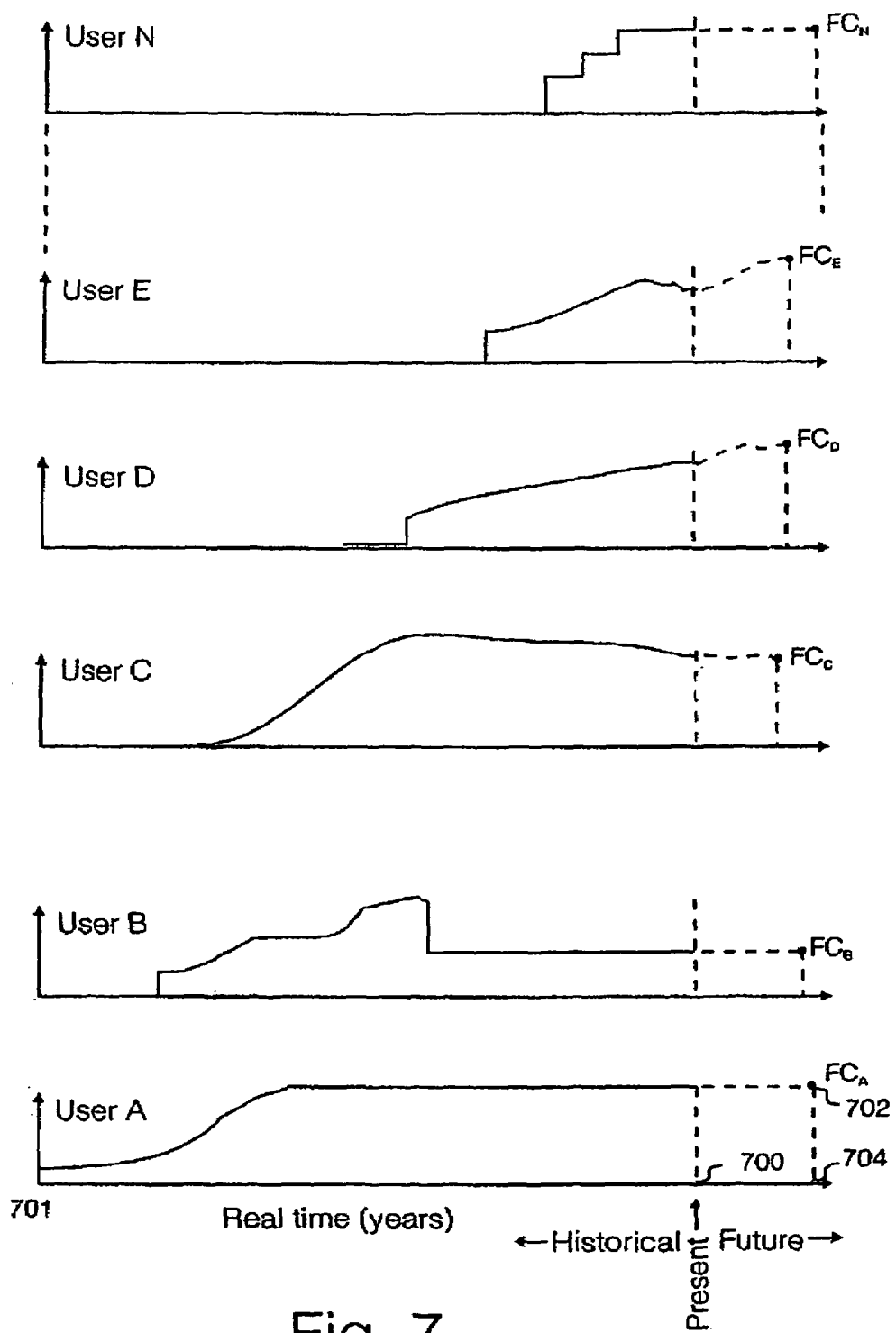
FIG. 7 illustrates schematically an aggregation of a plurality of user accounts, showing for each user account, data storage capacity utilized by that user account at a present time, at a historical time, and as a predicted future utilization.

Referring to FIG. 7 herein, there is illustrated schematically plots of data storage capacity utilization for a plurality of users A . . . N installed on the computer entity, plotted against time. As each user account is installed onto the computer entity, that user account utilizes data storage capacity on the data storage device 204, with the amount of data storage capacity utilized by each user account being dependent upon the characteristic demands of each particular user account. In general, demands vary from account to account. At a present time 700 the actual data storage capacity utilized by each user account can be read by the user account capacity data collection component 301. Since the capacity limit algorithm is run periodically, over a history period spanning from a time of first installation of a first user account, (user A) in the computer entity 701, up until the present time 700, for each user account, data is periodically sampled, and so a history of capacity utilization for each user account can be built up to be used as input data for the prediction algorithms 302, allowing for each user account a prediction of future capacity utilization shown schematically as a dotted line 702 in FIG. 7. Prediction algorithms are known in the art, and may include known heuristic prediction algorithms, known neural networks, known genetic algorithms and/or other artificial intelligence techniques. Examples of prediction algorithms used in the best mode are described herein. For each currently installed user account, a data storage capacity utilization at a pre-dicted future time, which can be pre-set into the algorithms 302 can be calculated. For example it may be selected to predict future capacity utilization for a look ahead period of the present time plus 2 years. In this case, the prediction algorithms 302 predict, for each user account A . . . N a predicted capacity utilization at a time 2 years into the future. A "predicted growth requirement" value for the computer entity as a whole is obtained by calculating the amount of capacity required for 2 years growth for every currently installed user account on the computer entity and then adding all these values together. This is shown schematically in FIG. 7 as adding all the predicted capacity values for the plurality of user accounts A . . . N at a future time 704, $FC_A + FC_B + FC_C + FC_D + FC_E + \ldots FC_N$.

Figure 8:
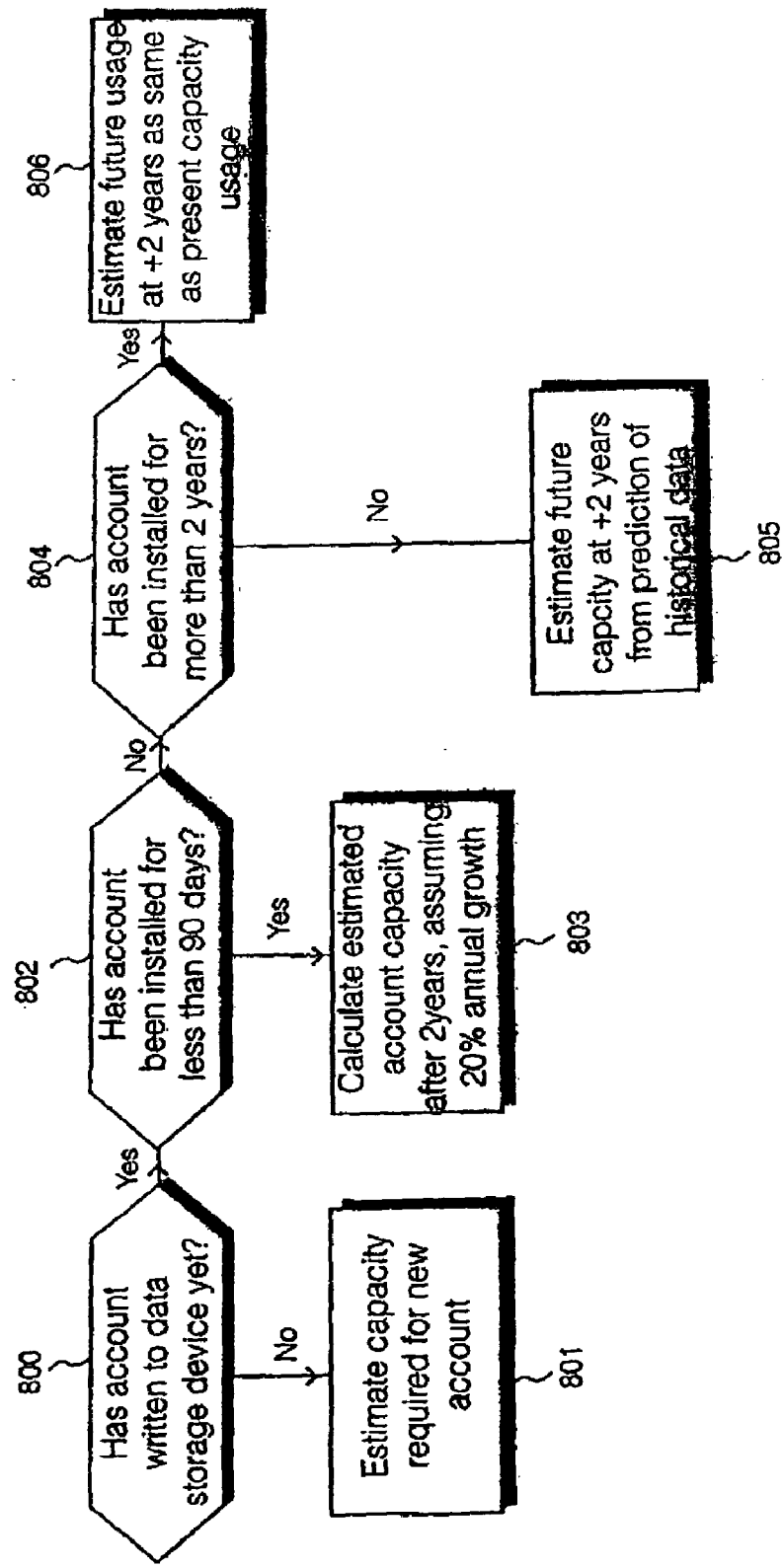
FIG. 8 illustrates schematically steps carried out to establish which one of a set of prediction algorithms will be used to predict a future data storage capacity utilization of a user account.

Referring to FIG. 8 herein, there is illustrated schematically process steps carried out by the prediction algorithms 302 for estimating a future capacity utilization requirement for a single user account, at a pre-determined future time, for example 2 years into the future, from the date the algorithm is run (the present time). In step 800, if the user account has not yet written data to the data storage device 204, then the prediction algorithm 302 estimates the capacity required for a new user account depending upon a model type data describing a model type of the computer entity. A range of computer entities may be supplied with different data storage capacities. For example, models may be designated as follows:

PC25:—suitable for 25 users
PC100:—suitable for 100 users
PC300–1000: suitable for 300 to 1000 users In step 801, the amount of data storage capacity required for the user account is estimated depending upon the model number as follows:

PC25:—estimated capacity required for new user account=500 MegaByte
PC100:—estimated capacity required for new user account=600 MegaByte
PC300–1000:—estimated capacity required for new user account=750 MegaByte If in step 800, the user account has already made a backup of data onto the data storage device 204, so that some data utilization information is available for that account via the user account capacity data collection component 301, then in step 802 it is checked whether the user account has been installed on the computer entity for more or less than 90 days. If the user account has been installed for less than 90 days, then in step 803 a prediction of data storage capacity utilization of the user account after time 2 years into the future is calculated using the assumption that, based upon the present capacity utilization the requirement for extra capacity will expand at a rate of 20% per year for the next 2 years. Therefore a calculation is made on the basis of:

$$\text{"estimated account capacity"} = \text{"current account capacity"} \times (1.20)^{\text{years of growth}}$$

where

"years of growth"=(730 days−number of days account has been installed)/365

If in step 802, the user account has been installed for 90 days or more, then in step 804, it is checked whether the user account has been installed for more than 2 years. If not, (user account 90 days or more old but less than 2 years old), then in step 805 the estimated future capacity requirement for that user account is predicted based upon stored historical capacity utilization data for that user account, to obtain the predicted future utilization after the future pre-determined period (2 years) based on the actual growth trend of utilization of that user account according to the formula:

$$\text{"estimated account capacity"} = \text{"current account capacity"} \times (\text{growth rate})^{\text{years of growth}}$$

where

"years of growth"=(730 days−number of days account has been installed/365)

and $$\text{"growth rate"} = \frac{365 \times (\text{"Current Account Capacity"} - \text{"Account Baseline Capacity"})}{(\text{"No of days account has been installed"} \times \text{"Account Baseline Capacity"})}$$

If in step 804, the account is found to have been installed for more than 2 years, then the estimated future usage at the pre-determined period (plus 2 years into the future) is estimated as being the same as the current capacity utilization for that user account.

Figure 9:
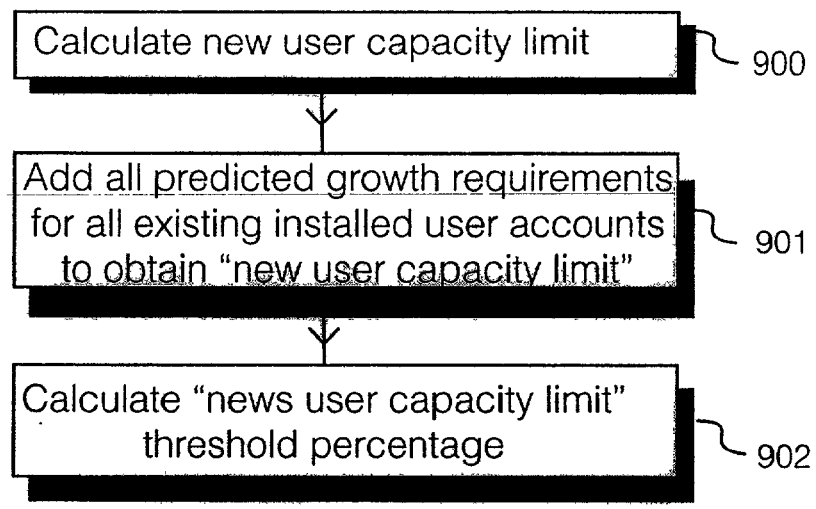
FIG. 9 illustrates schematically steps for calculating a new user capacity limit parameter from a summation of predicted capacity demands for a plurality of user accounts.

Referring to FIG. 9 herein, there is illustrated schematically process steps carried out for calculation of a new user capacity limit 900. In step 901, all of the predicted growth requirements obtained from running the process of FIG. 8 for each user account, are added, to obtain a new user capacity limit parameter. The new user capacity limit parameter is used as a threshold value, to compare with the current available licensed disk space in step 504. In step 902, there is calculated a new user capacity limit threshold percentage parameter, which is used to determine whether or not an alert message is generated by alert generator 304. The new user capacity limit threshold percentage parameter is calculated as a percentage from the expression:

$$100 - \frac{(100 \times (\text{Predicted Growth Requirements} + \text{Estimated Capacity Required for New Account}))}{(\text{Licensed Appliance Disk})}$$

Each time the new user capacity limit parameter is calculated, the results are used to determine whether a web administration alert message should be displayed (which may also be displayed on the LCD 103).

Figure 10:
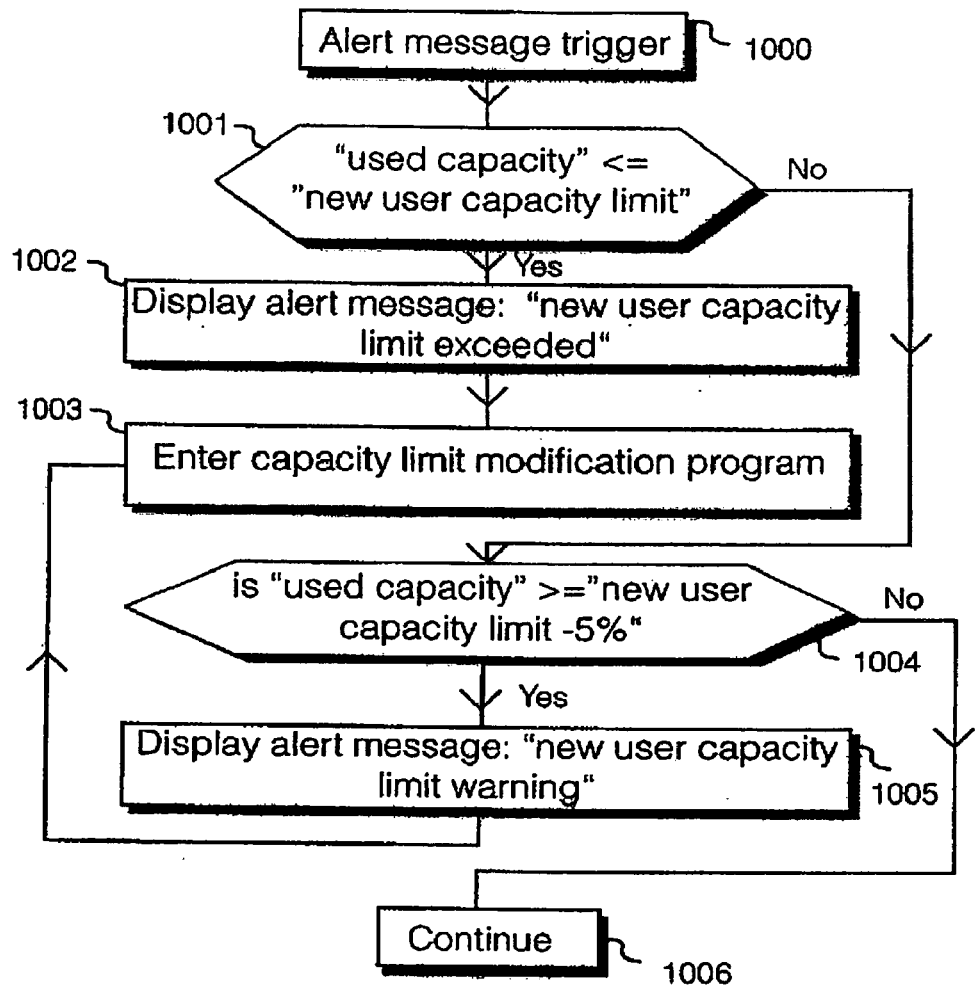
FIG. 10 illustrates schematically a set of processes for triggering alert messages displayed on a web administration interface of a computer entity.

Referring to FIG. 10 herein, there is illustrated schematically operation of compare component 303 and alert generation component 304. An alert message trigger process 1000 operates as follows:

In process 1001 the calculated used capacity is compared with the new user capacity limit parameter. If the used capacity is greater than the new user capacity limit, then in step 1002 the alert generator 304 generates an alert message that the new user capacity limit is exceeded, and the capacity management application 208 enters a capacity limit modification program 1003. The capacity limit modification program 1003, operated by the capacity limit modification component 305 allows a user, via the web administration interface to modify, within pre-determined parameters the current new user capacity limit for the computer entity. In other words, this overrides the summation of predicted growth requirements generated by the prediction algorithms, and allows an administrator to temporarily allow a new user onto the computer entity, even though addition of that new user may, according to predictions, cause over utilization of the computer entity at a future date.

If in step 1001 the user capacity is less than the new user capacity limit, then in step 1004, it is checked whether the used capacity is greater than or equal to the new user capacity limit minus 5%. This step checks whether the used capacity is approaching the new user capacity limit. If the comparison in step 1004 proves positive, i.e. user capacity is within 5% of the new user capacity limit, then in step 1005 the alert generator 304 generates a new user capacity limit warning alert message, and the capacity management application enters the capacity limit modification wizard program 1003 as described herein before. However, if the user capacity is not approaching (within 5%) the new user capacity limit, then operation proceeds in step 1006 allowing addition of new users onto the computer entity.

Figure 11:
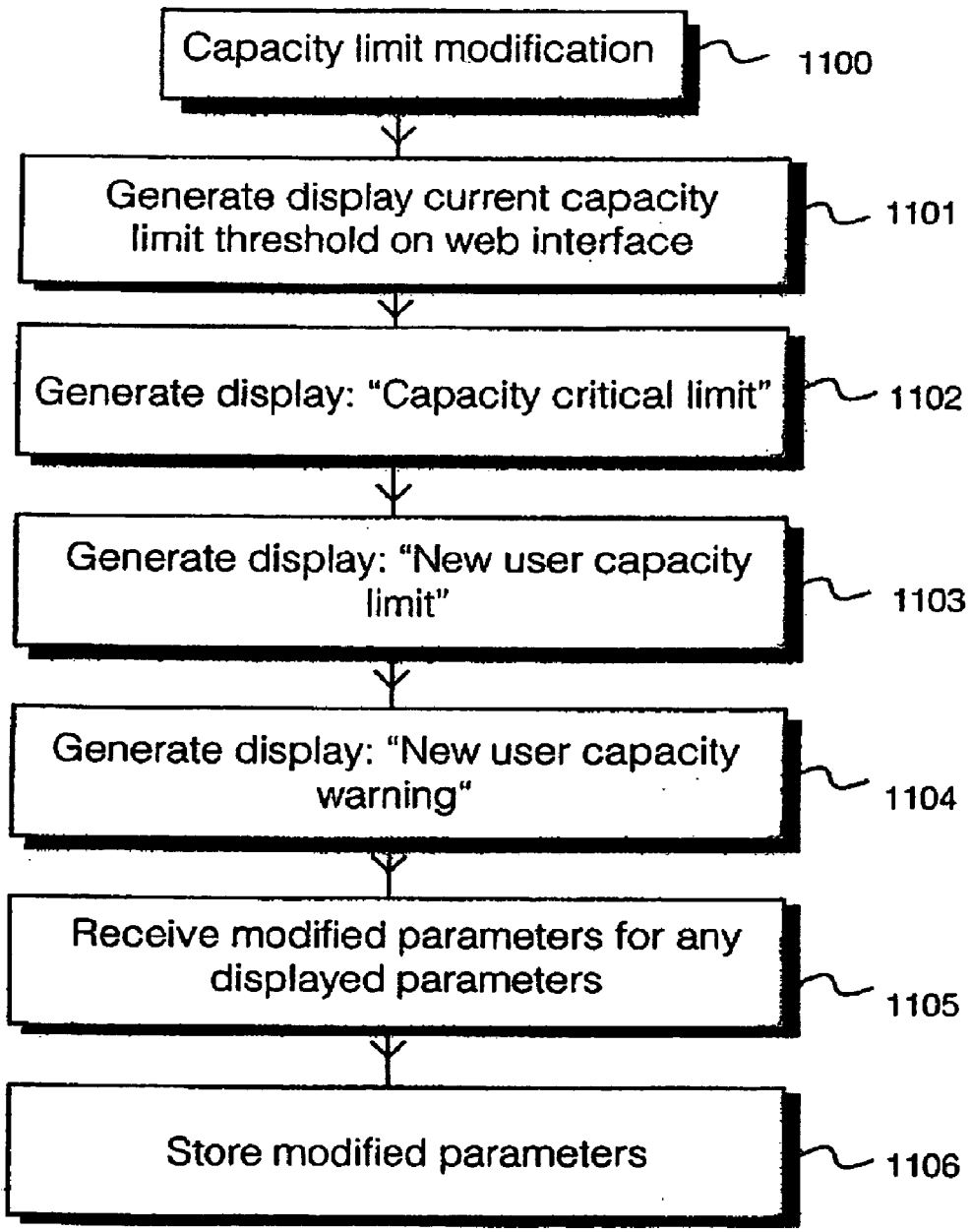
FIG. 11. Illustrates schematically processes for display of warnings on a web administration interface, and receipt of parameters from an administrator, for modifying various capacity limit parameters.

Referring to FIG. 11 herein, there is illustrated schematically processes operated by the capacity limit modification component 305. The capacity limit modification component 305 generates interactive displays accessible via the web administration interface, by which an administrator, from a remotely connected computer entity, can modify the parameters of the capacity warning limit, a capacity critical limit, a new user capacity limit, and a new user capacity warning. All warning limit values are displayed as percentage values. In process 1101, there is generated a warning display of the current capacity limit threshold. The capacity warning limit display displays a severity alert warning on the web administration interface and/or liquid crystal display 103. When the percentage of the computer entities total data storage capacity (used capacity) against the total licensed capacity reaches a threshold value. The default value for this is set at 90%. In process 1102 there is generated a capacity critical limit display, describing a value in MegaBytes of a critical capacity limit, that is when the percentage utilization of the computer entity (used capacity) against total licensed capacity reaches the threshold. Normally this capacity critical limit is set at a default value of 95%. That default value can be modified by a user via the web administration interface by entering a parameter, which is received by the capacity limit modification component 305 in process 1105 and stored as a modified parameter in step 1106. In process 1103, there is generated a new user capacity limit display. This normally displays a latest calculated new user capacity limit percentage. However, if an administrator overrides this parameter by entering a manual value, then this value is used in all subsequent new user capacity limit checks, for example when a new user account is installed, and it is not recalculated. Every time the manual override is used, the new user capacity warning threshold is set to this manual value minus 5%. The administrator can set the new user capacity limit threshold back to an automatic mode via the web administration interface display if they wish, and return to an automatic calculation of new user capacity limit as described herein before. In process 1104, there is generated a new user capacity warning display. The new user capacity warning display normally displays a latest calculated new user capacity limit percentage minus 5%. However, if the administrator overrides this value with a manually entered value via the web administration interface, then this value is then used in all subsequent new user capacity limit warning checks, for example when a new user account is installed, and it is not recalculated. The administrator can set the new user capacity warning threshold back to an automatic mode, which returns to the automatically calculated new user capacity limit minus 5%.

The invention claimed is:

1. A computer implemented method of operating a computer entity comprising at least one data processor, and a data storage device for automatically admitting or rejecting a new user account onto said computer entity, said method comprising the steps of:

in response to a request to add a new user account to said computer entity:
(i) generating a prediction of future utilization of data storage capacity required by said requested new user account for a predetermined look-ahead period;
(ii) for each of a plurality of user accounts currently installed on said compute entity, determining a predicted future utilization of capacity by said user account;
(iii) from said result of steps (i) and (ii), determining an overall predicted future utilization of said functionality of said computer entity over said predetermined look-ahead period;
(iv) determining a currenUy available unutilized functionally of said computer entity, unused by any of said current user accounts;
(v) comparing said currently unused functionally with said predicted future utilization of functionally and
(vi) depending upon a result of said comparison, aliowing or disallowing entry of said new user account onto said computer entity.

2. The method as claimed in claim 1, further comprising the step of:
(vii) generating an alert signal if, as a result of said comparison step, said predicted future utilization of functionality is within a predetermined percentage of said currently available unused functionality.

3. The method as claimed in claim 1, further comprising the steps of:
displaying an alert message describing a condition that a predicted fixture utilization of functionality is close to a currently unused functionality; and
allowing modification of a level of comparison at which said alert message is triggered.

4. A computer entity for performing the steps of claim 1.

5. A memory or machine-readable medium programmed to cause a computer to perform the method of claim 1.

* * * * *